US012650662B2

(12) United States Patent
Someya et al.

(10) Patent No.: US 12,650,662 B2
(45) Date of Patent: Jun. 9, 2026

(54) IMAGE FORMING APPARATUS

(71) Applicants: Yukimichi Someya, Kanagawa (JP); Hitoshi Fujiwara, Kanagawa (JP); Natsuki Watanabe, Kanagawa (JP); Hiroyuki Shimada, Kanagawa (JP)

(72) Inventors: Yukimichi Someya, Kanagawa (JP); Hitoshi Fujiwara, Kanagawa (JP); Natsuki Watanabe, Kanagawa (JP); Hiroyuki Shimada, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/928,550

(22) Filed: Oct. 28, 2024

(65) Prior Publication Data

US 2025/0164920 A1 May 22, 2025

(30) Foreign Application Priority Data

Nov. 17, 2023 (JP) ................................ 2023-195705

(51) Int. Cl.
*G03G 21/16* (2006.01)
*G03G 15/20* (2006.01)

(52) U.S. Cl.
CPC ..... *G03G 21/1633* (2013.01); *G03G 15/2035* (2013.01); *G03G 15/2053* (2013.01); *G03G 15/2064* (2013.01); *G03G 21/1685* (2013.01); *G03G 2215/2009* (2013.01)

(58) Field of Classification Search
CPC ........... G03G 21/1633; G03G 21/1638; G03G 21/1685; G03G 15/2017; G03G 15/2032; G03G 15/2035; G03G 15/2053
See application file for complete search history.

(56) References Cited

U.S. PATENT DOCUMENTS

| | | | | |
|---|---|---|---|---|
| 2009/0148204 | A1 | 6/2009 | Yoshinaga et al. | |
| 2021/0278790 | A1 | 9/2021 | Furuichi et al. | |
| 2023/0297017 | A1* | 9/2023 | Watanabe .......... | G03G 15/2064 399/331 |

(Continued)

FOREIGN PATENT DOCUMENTS

| | | | |
|---|---|---|---|
| JP | 2000-338815 | A | 12/2000 |
| JP | 2001-201975 | A | 7/2001 |

(Continued)

OTHER PUBLICATIONS

JP 2008122744 English machine translation, Maruta, May 29, 2008 (Year: 2008).*

*Primary Examiner* — Thomas S Giampaolo, II
(74) *Attorney, Agent, or Firm* — XSENSUS LLP

(57) ABSTRACT

An image forming apparatus includes an apparatus body and a pressure device that is disposed inside the apparatus body. The pressure device includes a pressure body and a pressed body that is disposed opposite the pressure body. A presser presses the pressure body against the pressed body. A release lever pivots in a forward direction to cause the presser to release pressure applied to the pressure body. An apparatus body cover pivots to cause the presser to release the pressure applied to the pressure body. A restrictor is mounted on the apparatus body cover. The restrictor restricts tilting of the release lever in an axial direction of the release lever while the release lever pivots.

19 Claims, 7 Drawing Sheets

(56) References Cited

U.S. PATENT DOCUMENTS

2023/0367246 A1 11/2023 Furuichi et al.

FOREIGN PATENT DOCUMENTS

| | | | | |
|---|---|---|---|---|
| JP | 2008122744 | A | * | 5/2008 |
| JP | 2009-145417 | A | | 7/2009 |
| JP | 2012-238018 | A | | 12/2012 |
| JP | 2020-052345 | A | | 4/2020 |

* cited by examiner

IMAGE FORMING APPARATUS

CROSS-REFERENCE TO RELATED APPLICATION

This patent application is based on and claims priority pursuant to 35 U.S.C. § 119(a) to Japanese Patent Application No. 2023-195705, filed on Nov. 17, 2023, in the Japan Patent Office, the entire disclosure of which is hereby incorporated by reference herein.

BACKGROUND

Technical Field

Embodiments of this disclosure relate to an image forming apparatus, and more particularly, to an image forming apparatus incorporating a pressure device.

Related Art

Related-art image forming apparatuses, such as copiers, printers, facsimile machines, and multifunction peripherals (MFP) having two or more of copying, printing, scanning, facsimile, plotter, and other functions, typically form an image on a recording medium according to image data.

Such image forming apparatuses include a pressure device such as a fixing device that includes a presser (e.g., a pressure mechanism). The presser includes a pressure lever that presses a pressure body such as a pressure roller against a pressed body such as a fixing roller.

SUMMARY

This specification describes below an improved image forming apparatus. In one embodiment, the image forming apparatus includes an apparatus body and a pressure device that is disposed inside the apparatus body. The pressure device includes a pressure body and a pressed body that is disposed opposite the pressure body. A presser presses the pressure body against the pressed body. A release lever pivots in a forward direction to cause the presser to release pressure applied to the pressure body. An apparatus body cover pivots to cause the presser to release the pressure applied to the pressure body. A restrictor is mounted on the apparatus body cover. The restrictor restricts tilting of the release lever in an axial direction of the release lever while the release lever pivots.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
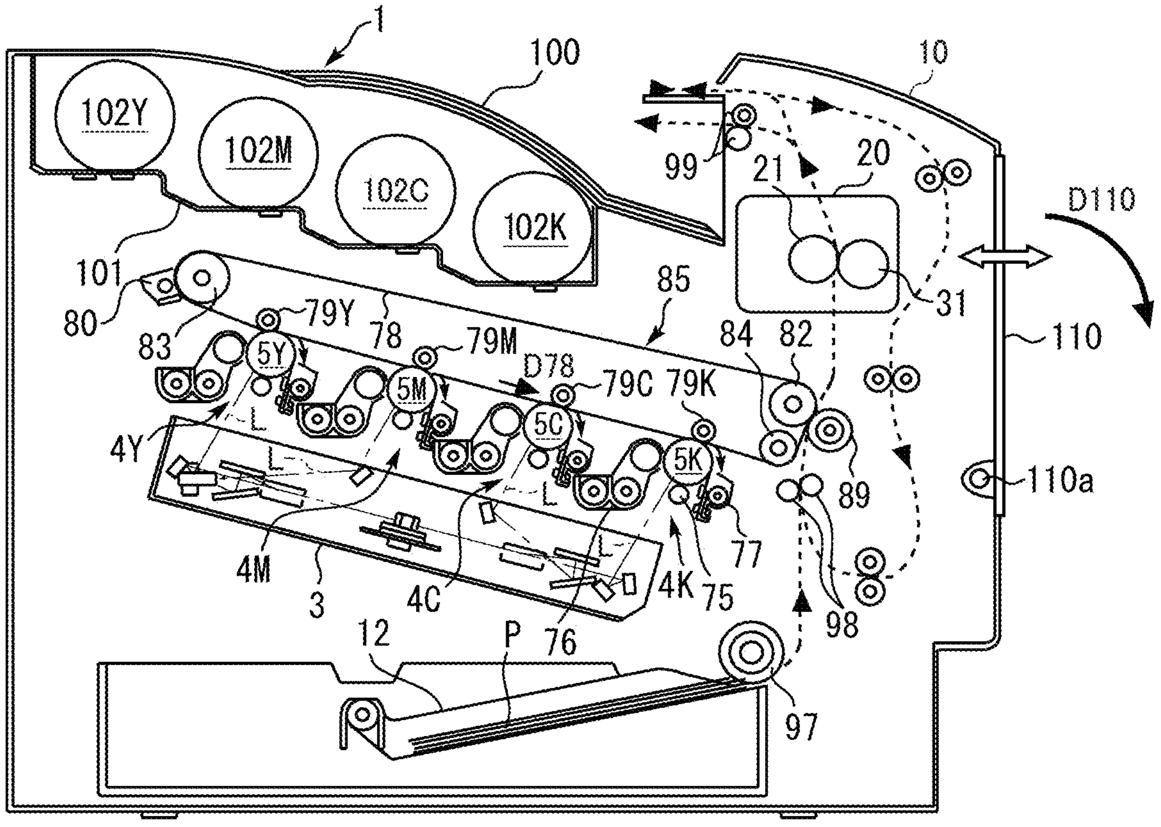
FIG. 1 is a cross-sectional view of an entirety of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to the drawings, the following describes the embodiments of the present disclosure in detail. In the drawings, identical reference numerals are assigned to elements that are identical or equivalent and redundant descriptions of the elements are simplified or omitted properly.

Referring to FIG. 1, a description is provided of an entire construction and operation of an image forming apparatus 1 according to an embodiment of the present disclosure.

As illustrated in FIG. 1, the image forming apparatus 1 according to the embodiment is a tandem type color printer. The image forming apparatus 1 includes an apparatus body 10 that accommodates a bottle holder 101 disposed in an upper portion of the apparatus body 10. The bottle holder 101 holds four toner bottles 102Y, 102M, 102C, and 102K that contain yellow, magenta, cyan, and black toners, respectively. The toner bottles 102Y, 102M, 102C, and 102K are detachably attached to the bottle holder 101 for replacement.

Below the bottle holder 101 is an intermediate transfer unit 85 that includes an intermediate transfer belt 78. The intermediate transfer belt 78 is disposed opposite image forming devices 4Y, 4M, 4C, and 4K that are arranged along the intermediate transfer belt 78 and form yellow, magenta, cyan, and black toner images, respectively.

The image forming devices 4Y, 4M, 4C, and 4K include photoconductive drums 5Y, 5M, 5C, and 5K, respectively. Each of the photoconductive drums 5Y, 5M, 5C, and 5K is surrounded by a charger 75, a developing device 76, a cleaner 77, a discharger, and the like. A series of image forming processes including a charging process, an exposure process, a developing process, a primary transfer process, and a cleaning process is performed on a surface of each of the photoconductive drums 5Y, 5M, 5C, and 5K. Thus, the yellow, magenta, cyan, and black toner images are formed on the surfaces of the photoconductive drums 5Y, 5M, 5C, and 5K, respectively.

The image forming apparatus 1 further includes an exposure device 3 and a motor that drives and rotates the photoconductive drums 5Y, 5M, 5C, and 5K clockwise in FIG. 1. When the surfaces of the photoconductive drums 5Y, 5M, 5C, and 5K reach charging positions disposed opposite the chargers 75, the chargers 75 uniformly charge the surfaces of the photoconductive drums 5Y, 5M, 5C, and 5K, respectively, in the charging process.

Thereafter, when the charged surfaces of the photoconductive drums 5Y, 5M, 5C, and 5K, respectively, reach irradiation positions disposed opposite the exposure device 3, the exposure device 3 emits laser beams L that scan the surfaces of the photoconductive drums 5Y, 5M, 5C, and 5K, respectively. Thus, electrostatic latent images to be developed into the yellow, magenta, cyan, and black toner images are formed on the surfaces of the photoconductive drums 5Y, 5M, 5C, and 5K, respectively, in the exposure process.

Thereafter, when the surfaces of the photoconductive drums 5Y, 5M, 5C, and 5K reach developing positions disposed opposite the developing devices 76, the developing devices 76 develop the electrostatic latent images into the yellow, magenta, cyan, and black toner images, respectively, in the developing process.

The image forming apparatus 1 further includes primary transfer bias rollers 79Y, 79M, 79C, and 79K. Thereafter, when the surfaces of the photoconductive drums 5Y, 5M, 5C, and 5K reach primary transfer positions disposed opposite the intermediate transfer belt 78 and the primary transfer bias rollers 79Y, 79M, 79C, and 79K, respectively, the primary transfer bias rollers 79Y, 79M, 79C, and 79K primarily transfer the yellow, magenta cyan, and black toner images formed on the photoconductive drums 5Y, 5M, 5C, and 5K, respectively, onto the intermediate transfer belt 78 in the primary transfer process. The surfaces of the photoconductive drums 5Y, 5M, 5C, and 5K, respectively, bear residual toner in a slight amount that is failed to be transferred onto the intermediate transfer belt 78.

Thereafter, when the surfaces of the photoconductive drums 5Y, 5M, 5C, and 5K reach cleaning positions disposed opposite the cleaners 77, respectively, cleaning blades of the cleaners 77 mechanically remove and collect the residual toner from the photoconductive drums 5Y, 5M, 5C, and 5K in the cleaning process.

Thereafter, when the surfaces of the photoconductive drums 5Y, 5M, 5C, and 5K reach discharging positions disposed opposite the dischargers, respectively, the dischargers remove a residual electric potential on the photoconductive drums 5Y, 5M, 5C, and 5K.

Thus, the series of image forming processes performed on the photoconductive drums 5Y, 5M, 5C, and 5K is finished.

The yellow, magenta, cyan, and black toner images, that are developed in the developing process and primarily transferred from the photoconductive drums 5Y, 5M, 5C, and 5K, are superimposed on a surface of the intermediate transfer belt 78. Thus, a color toner image is formed on the intermediate transfer belt 78.

The intermediate transfer unit 85 includes the intermediate transfer belt 78, the four primary transfer bias rollers 79Y, 79M, 79C, an 79K, a secondary transfer backup roller 82, a cleaning backup roller 83, a tension roller 84, and an intermediate transfer belt cleaner 80. The intermediate transfer belt 78 is stretched taut across and supported by three rollers, that is, the secondary transfer backup roller 82, the cleaning backup roller 83, and the tension roller 84. One of the three rollers, that is, the secondary transfer backup roller 82, drives and rotates the intermediate transfer belt 78 serving as an endless belt in a direction indicated by arrow in FIG. 1, that is, a rotation direction D78.

The four primary transfer bias rollers 79Y, 79M, 79C, and 79K and the photoconductive drums 5Y, 5M, 5C, and 5K, respectively, sandwich the intermediate transfer belt 78 to form primary transfer nips therebetween. The primary transfer bias rollers 79Y, 79M, 79C, and 79K are applied with transfer biases having polarities opposite to polarities of the yellow, magenta, cyan, and black toners, respectively.

The intermediate transfer belt 78 rotates in the rotation direction D78 and passes through the primary transfer nips formed by the primary transfer bias rollers 79Y, 79M, 79C, and 79K successively. Accordingly, the primary transfer bias rollers 79Y, 79M, 79C, and 79K primarily transfer the yellow, magenta, cyan, and black toner images formed on the photoconductive drums 5Y, 5M, 5C, and 5K, respectively, onto the intermediate transfer belt 78 such that the yellow, magenta, cyan, and black toner images are superimposed on the intermediate transfer belt 78.

The image forming apparatus 1 further includes a secondary transfer roller 89. The yellow, magenta, cyan, and black toner images superimposed on the intermediate transfer belt 78 reach a secondary transfer position disposed opposite the secondary transfer roller 89. At the secondary transfer position, the secondary transfer backup roller 82 and the secondary transfer roller 89 sandwich the intermediate transfer belt 78 to form a secondary transfer nip between the secondary transfer roller 89 and the intermediate transfer belt 78. The secondary transfer roller 89 secondarily transfers the yellow, magenta, cyan, and black toner images formed on the intermediate transfer belt 78 onto a sheet P serving as a recording medium conveyed through the secondary transfer nip. The intermediate transfer belt 78 bears residual toner failed to be transferred onto the sheet P.

Thereafter, the residual toner on the intermediate transfer belt 78 reaches a cleaning position disposed opposite the intermediate transfer belt cleaner 80. At the cleaning position, the intermediate transfer belt cleaner 80 collects the residual toner from the intermediate transfer belt 78.

Thus, a series of transfer processes performed on the intermediate transfer belt 78 is finished.

The image forming apparatus 1 further includes a sheet feeder 12, a feed roller 97, and a registration roller pair 98 (e.g., a timing roller pair). The sheet feeder 12 is disposed in a lower portion of the apparatus body 10. The feed roller 97 conveys the sheet P from the sheet feeder 12 to the registration roller pair 98. The registration roller pair 98 conveys the sheet P to the secondary transfer nip.

For example, the sheet feeder 12 loads a plurality of sheets P stacked therein. As the feed roller 97 is driven and rotated counterclockwise in FIG. 1, the feed roller 97 feeds an uppermost sheet P of the plurality of sheets P toward a roller nip formed between two rollers of the registration roller pair 98.

The registration roller pair 98 that interrupts rotation temporarily halts the sheet P conveyed to the registration roller pair 98 at the roller nip. The registration roller pair 98 resumes rotation and conveys the sheet P to the secondary transfer nip at a time when the color toner image formed on the intermediate transfer belt 78 reaches the secondary transfer nip. The secondary transfer roller 89 secondarily transfers the color toner image from the intermediate transfer belt 78 onto the sheet P.

The image forming apparatus 1 further includes a fixing device 20, an output roller pair 99, and an output tray 100 (e.g., a stacking portion). Thereafter, the secondary transfer roller 89 conveys the sheet P transferred with the color toner image at the secondary transfer nip to the fixing device 20. The fixing device 20 includes a fixing belt 21 and a pressure roller 31. The fixing belt 21 and the pressure roller 31 fix the color toner image transferred on a surface of the sheet P under heat and pressure in a fixing process.

Thereafter, the sheet P is conveyed through a roller nip formed between two rollers of the output roller pair 99 and ejected onto an outside of the apparatus body 10. The sheets P ejected by the output roller pair 99 are stacked on the output tray 100 successively as outputs.

Thus, a series of image forming processes performed by the image forming apparatus 1 is finished.

The image forming apparatus 1 further includes an apparatus body cover 110 and a pivot shaft 110*a*.

Figure 2:
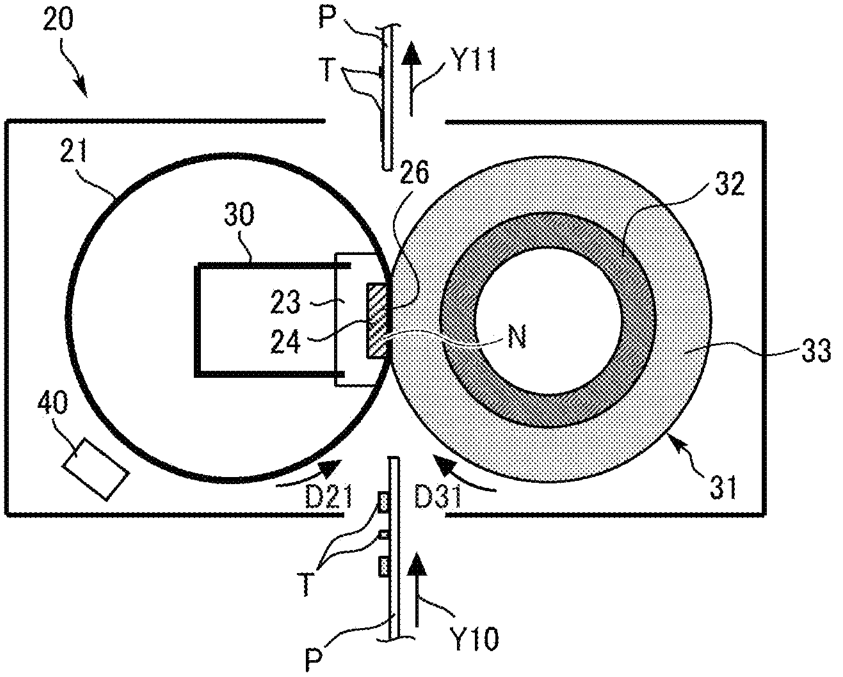
FIG. 2 is a cross-sectional view of a fixing device incorporated in the image forming apparatus depicted in FIG. 1.
Figure 3:
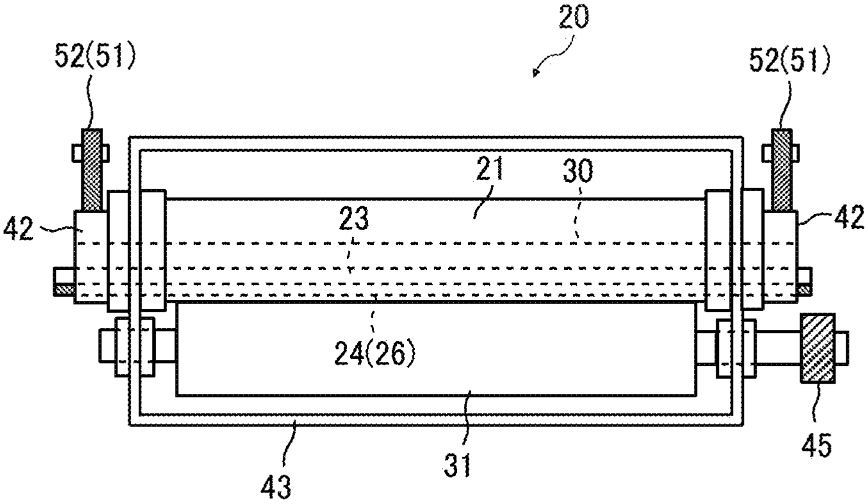
FIG. 3 is a top view of the fixing device depicted in FIG. 2 that extends in a width direction thereof.
Figure 4:
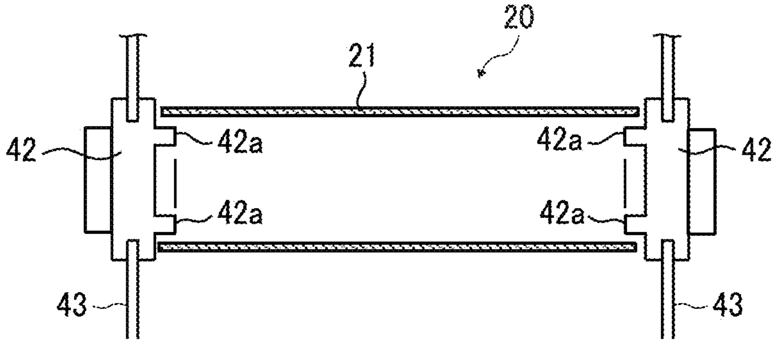
FIG. 4 is a schematic side view of the fixing device depicted in FIG. 2 that extends in the width direction thereof, illustrating a fixing belt and a plurality of guides incorporated in the fixing device.

Referring to FIGS. 2 to 4 and the like, a description is provided of a construction and operation of the fixing device 20 incorporated in the image forming apparatus 1 in detail.

The fixing device 20 conveys the sheet P bearing an unfixed toner image T under heat. The fixing device 20 also serves as a pressure device incorporating a presser 51 (e.g., a pressure mechanism) depicted in FIGS. 5A and 5B.

As illustrated in FIGS. 2 to 4 and the like, the fixing device 20 includes the fixing belt 21 serving as a fixing rotator, a reinforcement 30, a laminated heater 24 serving as a heater or a heating body, a holder 23, the pressure roller 31 serving as a pressure rotator, and a temperature sensor 40 serving as a temperature detector.

As the apparatus body cover 110 of the apparatus body 10 depicted in FIG. 1 pivots about the pivot shaft 110*a*, the apparatus body cover 110 is opened so that the fixing device 20 is removed from and installed into the apparatus body 10.

The fixing belt 21 is an endless belt that contacts an outer circumferential face of the pressure roller 31 and rotates in accordance with rotation of the pressure roller 31. The fixing belt 21 is the endless belt that is thin and flexible. As the pressure roller 31 rotates in a rotation direction D31, the pressure roller 31 drives and rotates the fixing belt 21 counterclockwise in FIG. 2 in a rotation direction D21. The fixing belt 21 includes a base layer, an elastic layer disposed on the base layer, and a release layer disposed on the elastic layer. The base layer defines an inner circumferential face of the fixing belt 21 as a sliding contact surface that slides over the laminated heater 24. The fixing belt 21 has a total thickness not greater than 1 mm.

The base layer of the fixing belt 21 has a layer thickness in a range of from 30 μm to 50 μm. The base layer is made of a metal material such as nickel and stainless steel or a resin material such as polyimide.

The elastic layer of the fixing belt 21 has a layer thickness in a range of from 100 μm to 300 μm. The elastic layer is made of a rubber material such as silicone rubber, silicone rubber foam, and fluororubber. The elastic layer prevents slight surface asperities from generating on an outer circumferential face of the fixing belt 21 at a fixing nip N formed between the fixing belt 21 and the pressure roller 31. Thus, heat is conducted from the fixing belt 21 to the toner image T on the sheet P evenly, suppressing formation of an orange peel image.

The release layer of the fixing belt 21 has a layer thickness in a range of from 5 μm to 50 μm. The release layer is made of perfluoroalkoxy alkane (PFA), polytetrafluoroethylene (PTFE), polyimide, polyetherimide, polyether sulfone (PES), or the like. The release layer facilitates separation and peeling of toner of the toner image T from the fixing belt 21.

The laminated heater 24, the holder 23, the reinforcement 30, and the like are disposed within a loop formed by the fixing belt 21 and disposed opposite the inner circumferential face of the fixing belt 21.

The laminated heater 24, that is disposed within the loop formed by the fixing belt 21 and disposed opposite the inner circumferential face of the fixing belt 21, presses against the pressure roller 31 serving as a pressed body via the fixing belt 21, thus forming the fixing nip N serving as a nip portion through which the sheet P is conveyed. For example, the inner circumferential face of the fixing belt 21 slides over the laminated heater 24. The laminated heater 24 presses against the pressure roller 31 via the fixing belt 21 to form the fixing nip N between the fixing belt 21 and the pressure roller 31. The sheet P is conveyed through the fixing nip N. Thus, the laminated heater 24 serves as a nip formation pad that forms the fixing nip N. In order to decrease sliding friction between the laminated heater 24 and the fixing belt 21, a low friction sheet made of a low friction material such as PTFE may cover a surface of the laminated heater 24 or the laminated heater 24 may include a surface layer made of the low friction material.

The laminated heater 24 includes a resistive pattern 26 over which the inner circumferential face of the fixing belt 21 slides. As a power supply supplies power to the resistive pattern 26 serving as a heat generation resistor, the resistive pattern 26 generates heat by resistance, thus heating the fixing belt 21. Hence, the laminated heater 24 also serves as a heater that heats the fixing belt 21.

According to the embodiment, the holder 23 holds the laminated heater 24. As illustrated in FIG. 3, the fixing device 20 further includes flanges 42 serving as pressure bodies and a frame 43. The flanges 42 support the holder 23 holding the laminated heater 24 at both lateral ends of the holder 23, respectively, in a longitudinal direction thereof that is perpendicular to a paper surface in FIG. 2 and parallel to a horizontal direction in FIG. 3. The frame 43 supports the flanges 42 such that the flanges 42 are slidable in a vertical direction in FIG. 3 or 4.

As described above, the laminated heater 24 that includes the resistive pattern 26 and is disposed within the loop formed by the fixing belt 21 heats the fixing belt 21 directly. Heat is conducted from the outer circumferential face of the fixing belt 21 heated by the laminated heater 24 to the toner image T on the sheet P.

The temperature sensor 40 serving as the temperature detector is a thermopile, a thermistor, or the like that is disposed opposite the outer circumferential face of the fixing belt 21. The image forming apparatus 1 further includes a controller that controls output from the laminated heater 24 based on a temperature of the outer circumferential face of the fixing belt 21, that is detected by the temperature sensor 40. As the controller controls output of the laminated heater 24, the controller adjusts a temperature (e.g., a fixing temperature) of the fixing belt 21 to a target temperature.

As illustrated in FIG. 4, the pair of flanges 42 contacts and guides the inner circumferential face of the fixing belt 21 at both lateral ends of the fixing belt 21 in a longitudinal direction thereof, retaining a posture of the fixing belt 21 that is substantially tubular.

For example, the two flanges 42 are made of a heat-resistant resin material or the like. The flanges 42 are supported by both lateral ends of the frame 43 of the fixing device 20 in a longitudinal direction of the frame 43, respectively, such that the flanges 42 are slidable toward the fixing nip N. Each of the flanges 42 includes a guide 42*a* and a stopper. The guide 42*a* supports the fixing belt 21 while the guide 42*a* retains the posture of the fixing belt 21 that is substantially tubular. The stopper restricts motion (e.g., skew) of the fixing belt 21 in the longitudinal direction thereof.

According to the embodiment, as illustrated in FIG. 3, each of the pressers 51 includes a pressure lever 52. The pressure lever 52 presses the fixing belt 21, the laminated heater 24, and the holder 23 against the pressure roller 31 via the flange 42.

In order to cause the laminated heater 24 to form the fixing nip N, the flanges 42 are disposed outboard from the fixing nip N in a circumferential direction of the fixing belt 21 and disposed at both lateral ends of the fixing belt 21, respectively, in the longitudinal direction thereof.

According to the embodiment, the flanges 42 and the laminated heater 24 contact the inner circumferential face of the fixing belt 21. The flanges 42 contact both lateral ends of the fixing belt 21 in the longitudinal direction thereof loosely. The fixing device 20 does not incorporate other guide (e.g., a belt guide) that contacts the inner circumferential face of the fixing belt 21 and guides the fixing belt 21 that rotates.

Accordingly, each of the fixing belt 21, the laminated heater 24, and the flanges 42 described below serves as a pressure body that presses against the pressure roller 31 serving as the pressed body.

According to the embodiment, the reinforcement 30 is disposed within the loop formed by the fixing belt 21 and is pressed against the pressure roller 31 via the holder 23, the laminated heater 24, and the fixing belt 21. The reinforcement 30 reinforces a strength of each of the laminated heater 24 and the holder 23 that form the fixing nip N. The reinforcement 30 is fastened to the holder 23 or the frame 43 with a screw or the like.

The reinforcement 30 is pressed against the pressure roller 31 via the holder 23, the laminated heater 24, and the fixing belt 21. Hence, when the holder 23 and the laminated heater 24 receive pressure from the pressure roller 31 at the fixing nip N, the reinforcement 30 prevents the holder 23 and the laminated heater 24 from being deformed substantially. In order to achieve the above-described functions of the reinforcement 30, the reinforcement 30 is preferably made of a metal material having an enhanced mechanical strength such as stainless steel and iron.

The holder 23 is made of a resin material or a metal material. For example, the holder 23 is made of a resin material that achieves a rigidity that prevents the holder 23 from being bent substantially when the holder 23 receives pressure from the pressure roller 31 and achieves heat resistance and thermal insulation. The resin material preferably includes liquid crystal polymer (LCP), polyamide imide (PAI), PES, polyphenylene sulfide (PPS), polyether nitrile (PEN), and polyetheretherketone (PEEK). According to the embodiment, the holder 23 is made of LCP.

As illustrated in FIG. 2, the pressure roller 31 serving as the pressure rotator includes a core metal 32 serving as a shaft and an elastic layer 33 disposed on the core metal 32. The fixing device 20 further includes a driving motor that drives and rotates the pressure roller 31 clockwise in FIG. 2 in a predetermined direction, that is, the rotation direction D31.

The core metal 32 of the pressure roller 31 is hollow and is made of a metal material. The elastic layer 33 of the pressure roller 31 is made of silicone rubber foam, silicone rubber, fluororubber, or the like. Optionally, the pressure roller 31 may further include a release layer that coats the elastic layer 33. The release layer is thin and is made of PFA, PTFE, or the like. The pressure roller 31 presses against the fixing belt 21 to form the fixing nip N therebetween. As illustrated in FIG. 3, the fixing device 20 further includes a gear 45 that is mounted on the pressure roller 31 and meshes with a driving gear coupled with the driving motor. Thus, the driving motor drives and rotates the pressure roller 31 clockwise in FIG. 2 in the rotation direction D31. The pressure roller 31 includes both lateral ends in a longitudinal direction thereof, that are rotatably supported by the frame 43 of the fixing device 20 through bearings, respectively.

Referring to FIGS. 1 and 2, a brief description is provided of regular operation of the fixing device 20 having the construction described above.

As a power switch disposed inside the apparatus body 10 is turned on, the power supply supplies power to the laminated heater 24 and the driving motor starts driving and rotating the pressure roller 31 clockwise in FIG. 2 in the rotation direction D31. Accordingly, the pressure roller 31 drives and rotates the fixing belt 21 in the rotation direction D21 in accordance with rotation of the pressure roller 31 by friction between the pressure roller 31 and the fixing belt 21 at the fixing nip N.

Thereafter, the sheet feeder 12 supplies a sheet P to the secondary transfer roller 89. The secondary transfer roller 89 secondarily transfers an unfixed color toner image T onto the sheet P. The fixing device 20 further includes a guide plate that guides the sheet P. The sheet P bearing the unfixed color toner image Tis conveyed in a sheet conveyance direction Y10 depicted in FIG. 2 while the guide plate guides the sheet P. The sheet P enters the fixing nip N formed between the pressure roller 31 and the fixing belt 21 pressed against the pressure roller 31.

The fixing belt 21 heated by the laminated heater 24 heats the sheet P. The holder 23 and the laminated heater 24, that are reinforced by the reinforcement 30, and the pressure roller 31 apply pressure to the sheet P. Thus, the fixing belt 21 and the pressure roller 31 fix the unfixed color toner image T on the surface of the sheet P. Thereafter, the sheet P discharged from the fixing nip Nis conveyed in a sheet conveyance direction Y11.

A description is provided of a construction of a comparative image forming apparatus that includes a fixing device serving as a pressure device.

The fixing device includes a presser that includes a pressure lever that applies pressure. The fixing device further includes a release lever that releases pressure applied by the pressure lever.

The comparative image forming apparatus further includes an apparatus body and an apparatus body cover that is opened and closed with respect to the apparatus body. As a user closes the apparatus body cover that is opened in a state in which the release lever of the fixing device releases pressure, the apparatus body cover presses the release lever, moving the pressure lever at a pressure release position at which the pressure lever releases pressure to a pressing position at which the pressure lever applies pressure.

As the user closes the apparatus body cover, the release lever pivots so that the presser moves from the pressure release position to the pressing position. Thus, the user operates the pressure device simply.

However, when the release lever pivots about a support shaft, the release lever may be applied with a force in an axial direction of the support shaft. Hence, the release lever may tilt or twist in the axial direction of the support shaft. Accordingly, the release lever may not cause the presser to apply and release pressure properly.

A description is provided of advantageous construction and operation of the image forming apparatus 1 according to an embodiment of the present disclosure in detail.

Figure 5A:
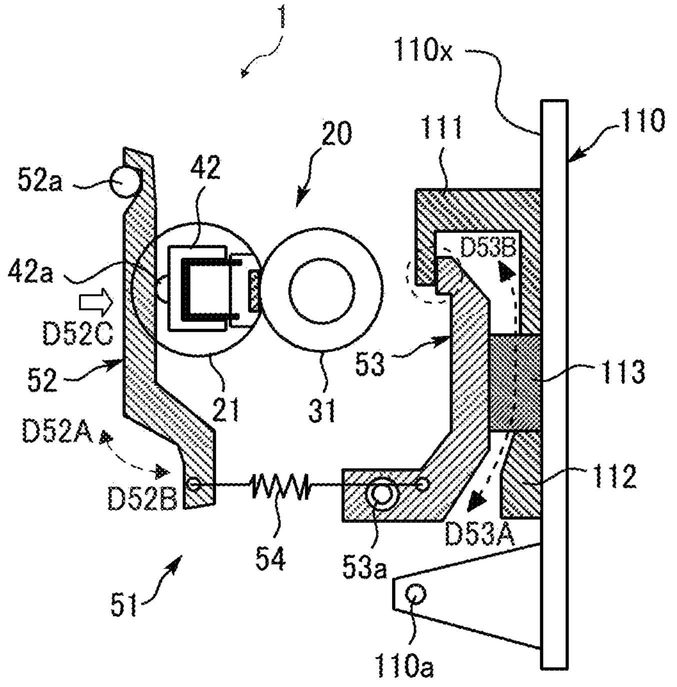
FIG. 5A is a diagram of the image forming apparatus depicted in FIG. 1, illustrating a release lever and a presser incorporated in the fixing device depicted in FIG. 3 when an apparatus body cover is closed.
Figure 5B:
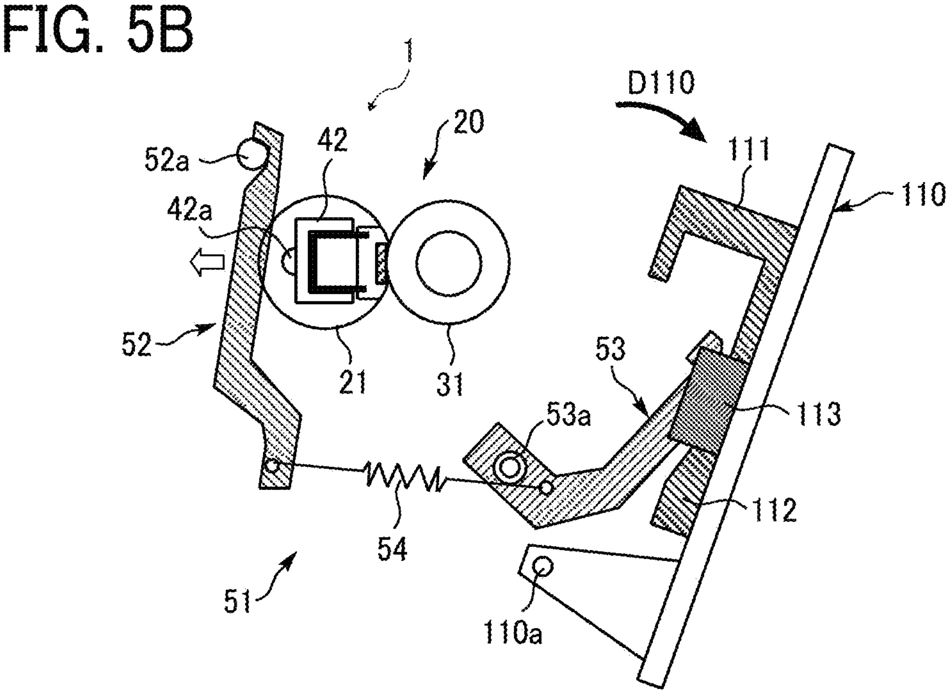
FIG. 5B is a diagram of the image forming apparatus depicted in FIG. 5A, illustrating the release lever and the presser when the apparatus body cover is opened.

As illustrated in FIGS. 5A and 5B, the fixing device 20 according to the embodiment serves as the pressure device that includes the presser 51 and a release lever 53. The fixing device 20 is disposed inside the apparatus body 10 depicted in FIG. 1 of the image forming apparatus 1.

The presser 51 presses the fixing belt 21 serving as the pressure body or the fixing rotator against the pressure roller 31 serving as the pressed body or the pressure rotator. The presser 51 includes the pressure lever 52 and a tension spring 54.

The fixing device 20 further includes a shaft 52*a*. The pressure lever 52 pivots about the shaft 52*a* in a forward direction D52A and a backward direction D52B. The pressure lever 52 biases the fixing belt 21 serving as the pressure body in a pressing direction D52C. For example, as described above with reference to FIG. 3 and the like, the pressure lever 52 presses against the guide 42*a* serving as a contact portion of the flange 42.

The fixing device 20 further includes a support shaft 53*a*. The release lever 53 pivots about the support shaft 53*a* clockwise in FIG. 5A in a predetermined direction, that is, a forward direction D53A. Thus, the release lever 53 releases pressure applied by the pressure lever 52 of the presser 51.

The tension spring 54 serving as a biasing member is anchored to the pressure lever 52 and the release lever 53. For example, the tension spring 54 includes a hook that is disposed at one end of the tension spring 54 and is coupled with one end of the pressure lever 52, that is opposite to another end of the pressure lever 52, that contacts the shaft 52*a*. The one end of the tension spring 54 is separated from the shaft 52*a*. The tension spring 54 further includes another hook that is disposed at another end of the tension spring 54 and is coupled with a proximal portion of the release lever 53, that is disposed in proximity to the support shaft 53*a*.

The pressers 51 configured as described above are disposed at both lateral ends of the fixing device 20, respectively, in a longitudinal direction thereof that is perpendicular to a paper surface of FIG. 5A. The pressers 51 may be disposed inside the apparatus body 10 and outside the fixing device 20 or may be disposed inside the fixing device 20 such that the pressers 51 are removably installed in the apparatus body 10 together with the fixing device 20. In a case that the pressers 51 are disposed inside the apparatus body 10 and outside the fixing device 20, the pressers 51 serve as a pressure device.

As described above with reference to FIG. 1 and the like, the apparatus body 10 is attached with the apparatus body cover 110. As the apparatus body cover 110 pivots about the pivot shaft 110*a* clockwise in FIGS. 1 and 5B in a predetermined direction, that is, a pivot direction D110, the apparatus body cover 110 opens and exposes an interior of the apparatus body 10.

For example, the apparatus body cover 110 opens and closes the interior of the apparatus body 10, that is, a space where the fixing device 20 is exposed.

As the apparatus body cover 110 opens and closes, the release lever 53 pivots about the support shaft 53*a* in the forward direction D53A and a backward direction D53B, causing the pressure lever 52 of the presser 51 to release pressure and apply pressure.

The image forming apparatus 1 further includes engagements 111, slope members 112, and restrictors 113 described below, that are mounted on both lateral ends of the apparatus body cover 110 in a longitudinal direction thereof and disposed opposite the release levers 53, respectively.

For example, as illustrated in FIGS. 5A, 5B, 6A, and 6B and the like, the apparatus body cover 110 includes a back face 110*x* that is disposed opposite the interior of the apparatus body 10. The back face 110*x* mounts the engagement 111 including a hook disposed at a tip of the engagement 111.

In order to open the apparatus body cover 110, the engagement 111 engages the release lever 53 and pivots the release lever 53 clockwise in FIG. 5A in the forward direction D53A.

Figure 6A:
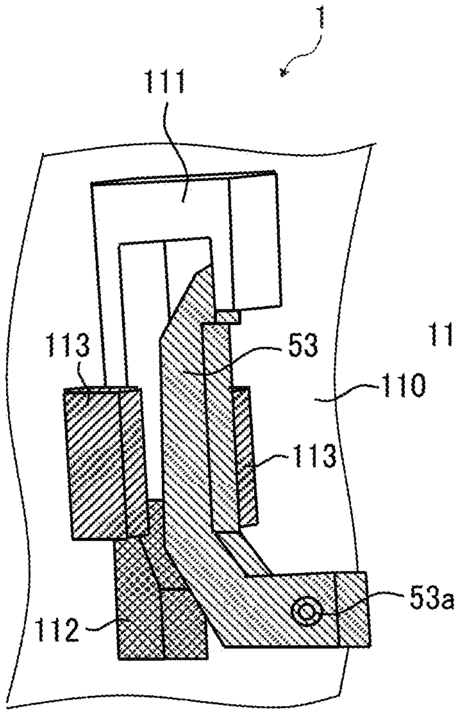
FIG. 6A is a perspective view of the image forming apparatus depicted in FIG. 5A, illustrating the release lever when the apparatus body cover is closed.

For example, as illustrated in FIGS. 5A and 6A, when the apparatus body cover 110 is closed as illustrated in FIGS. 1 and 5A, the engagement 111 mounted on the apparatus body cover 110 engages a tip of the release lever 53, that is enclosed with a broken line in FIG. 5A, restricting pivoting of the release lever 53 about the support shaft 53*a*. The tension spring 54 biases the pressure lever 52 to pivot about the shaft 52*a* in the pressing direction D52C indicated with an open arrow in FIG. 5A. Accordingly, the pressure lever 52 of the presser 51 presses the fixing belt 21 against the pressure roller 31 to form the fixing nip N.

Figure 6B:
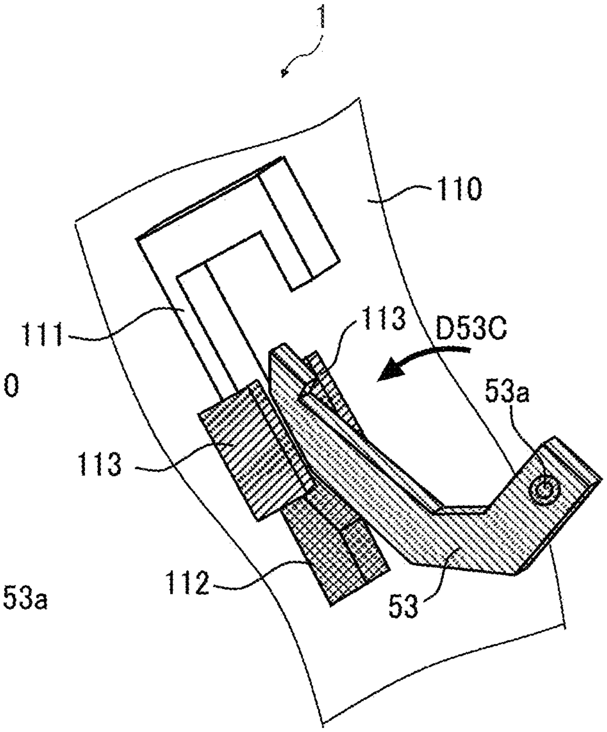
FIG. 6B is a perspective view of the image forming apparatus depicted in FIG. 5B, illustrating the release lever when the apparatus body cover is opened.

Conversely, as illustrated in FIGS. 5B and 6B, as the apparatus body cover 110 is moved from a closed position depicted in FIGS. 5A and 6A, that is, as the apparatus body cover 110 pivots about the pivot shaft 110*a* in the pivot direction D110, the release lever 53 that engages the engagement 111 also pivots about the support shaft 53*a* in the forward direction D53A. While the release lever 53 pivots, a vector of a biasing force from the tension spring 54 shifts. Thus, the biasing force from the tension spring 54, that causes the pressure lever 52 to apply pressure in the pressing direction D52C, is canceled. Accordingly, pressure applied by the pressure lever 52 of the presser 51 to press the fixing belt 21 against the pressure roller 31 is released.

Eventually, as illustrated in FIGS. 5B and 6B, the engagement 111 disengages the release lever 53. The release lever 53 pivots about the support shaft 53*a* by the weight thereof in a pivot direction D53C. Thereafter, the release lever 53 moves to and halts at a target position, for example, a contact position where the release lever 53 contacts the slope member 112 mounted on the apparatus body cover 110 that is opened.

Conversely, when the apparatus body cover 110 transits from an open state in which the apparatus body cover 110 is opened as illustrated in FIGS. 5B and 6B to a closed state in which the apparatus body cover 110 is closed as illustrated in FIGS. 5A and 6A, the release lever 53 performs motion opposite to motion described above to transit from the closed state to the open state. Accordingly, the fixing belt 21 and the pressure roller 31 transit from a pressure release state in which the fixing belt 21 does not press against the pressure roller 31 to a pressing state in which the fixing belt 21 presses against the pressure roller 31.

While the apparatus body cover 110 transits from the open state to the closed state, the release lever 53 that interrupts pivoting and halts as illustrated in FIGS. 5B and 6B is pressed by the apparatus body cover 110 that pivots about the pivot shaft 110*a* counterclockwise in FIG. 5B. Accordingly, the release lever 53 starts pivoting about the support shaft 53*a* counterclockwise in the pivot direction D53C depicted in FIG. 6B. The release lever 53 slides over the slope member 112 serving as a slide portion mounted on the back face 110*x* of the apparatus body cover 110 as described below in detail with reference to FIG. 7 and the like.

As described above, as an operator such as a user and a service engineer opens and closes the apparatus body cover 110 interlocked with the presser 51, the apparatus body cover 110 causes the presser 51 to release pressure and apply pressure, simplifying operation of the fixing device 20 by the operator.

For example, while the image forming apparatus 1 performs a print job, a sheet P may not be conveyed and may halt at the fixing nip N, and therefore may be jammed. In a case that the user removes the jammed sheet P, the user simply opens the apparatus body cover 110 to release pressure applied between the fixing belt 21 and the pressure roller 31 at the fixing nip N inside the fixing device 20. Thus, the user removes the jammed sheet P from the fixing nip N readily.

Additionally, after the user removes the jammed sheet P from the fixing nip N, the user simply closes the apparatus body cover 110 to retrieve the pressing state of the fixing device 20 in which the fixing belt 21 presses against the pressure roller 31 at the fixing nip N, preventing an error of the user who forgets retrieving the pressing state of the fixing device 20.

Figure 7:
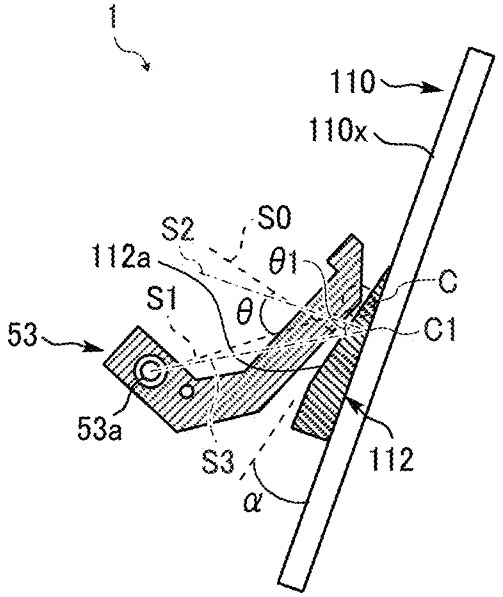
FIG. 7 is a diagram of the image forming apparatus depicted in FIG. 6B, illustrating the release lever and a slope member incorporated in the image forming apparatus when the apparatus body cover is opened.
Figure 8:
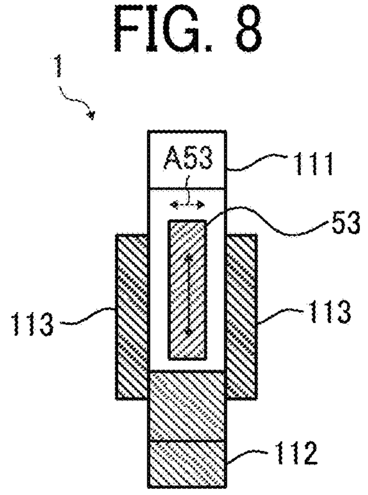
FIG. 8 is a diagram of the image forming apparatus depicted in FIG. 7, illustrating the release lever and a restrictor incorporated in the image forming apparatus, seen in a direction perpendicular to a back face of the apparatus body cover.

FIG. 7 is a diagram of the image forming apparatus 1, illustrating the release lever 53 and the slope member 112. FIG. 8 is a diagram of the image forming apparatus 1, illustrating the release lever 53 and the restrictor 113.

As illustrated in FIGS. 5A, 5B, 6A, 6B, and 8, the image forming apparatus 1 according to the embodiment includes a pair of restrictors 113 that is mounted on the apparatus body cover 110. The restrictors 113 restrict tilting of the release lever 53 in an axial direction A53 thereof that is perpendicular to a paper surface in FIGS. 5A and 5B and parallel to a horizontal direction in FIG. 8 while the release lever 53 pivots.

For example, each of the restrictors 113 is a wall that stands on the back face 110*x* of the apparatus body cover 110 in a direction perpendicular to the back face 110*x*. The restrictors 113 sandwich the release lever 53.

When the user opens and closes the apparatus body cover 110, the release lever 53 pivots about the support shaft 53*a*. As the release lever 53 is exerted with a force in the axial direction A53 of the release lever 53, the release lever 53 may tilt or twist in the axial direction A53 thereof. To address the circumstance, the restrictors 113 interfere with and stop the release lever 53, decreasing tilting and twisting of the release lever 53. Accordingly, the release lever 53 causes the presser 51 to apply and release pressure properly.

When the user opens and closes the apparatus body cover 110, the release lever 53 may tilt in the axial direction A53 thereof due to a biasing force from the tension spring 54. For example, an axial direction component of the biasing force from the tension spring 54 may be applied to the release lever 53 due to degradation in precision of a positional relation between the release lever 53 and the pressure lever 52 in the longitudinal direction of the fixing device 20.

Figure 9A:
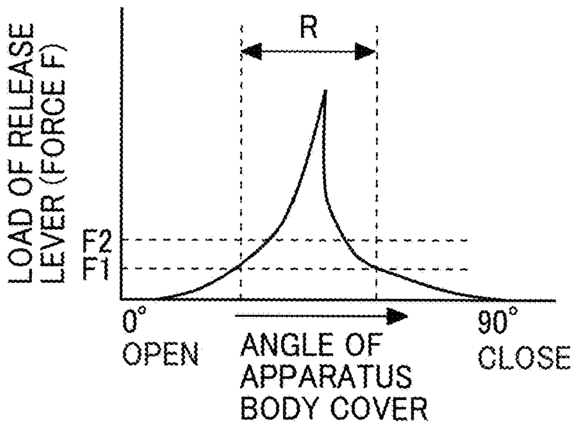
FIG. 9A is a graph illustrating a relation between an angle of the apparatus body cover defined with respect to a horizonal direction and a load imposed on the release lever when the apparatus body cover is closed.
Figure 9B:
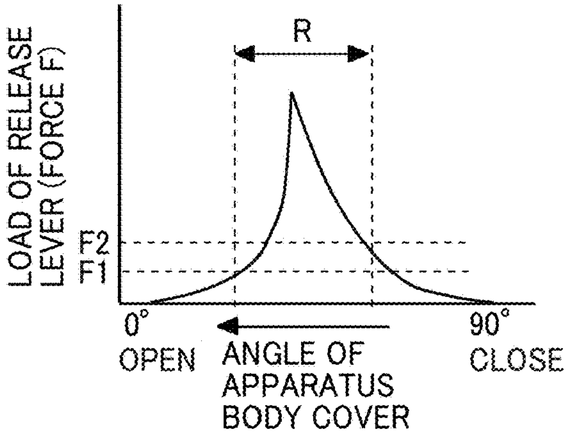
FIG. 9B is a graph illustrating the relation between the angle of the apparatus body cover defined with respect to the horizonal direction and the load imposed on the release lever when the apparatus body cover is opened.

As illustrated in FIGS. 9A and 9B, the restrictors 113 according to the embodiment serve as guides that are disposed in a guide range R where a force F (e.g., a load) applied to the release lever 53 in a tilt direction thereof when the release lever 53 pivots is not smaller than a predetermined value F1.

FIG. 9A illustrates a relation between an angle of the apparatus body cover 110 and a load applied to the release lever 53 when the user closes the apparatus body cover 110. As illustrated in FIG. 9A, as the tension spring 54 stretches sharply, the force F as the load applied to the release lever 53 increases sharply. Eventually, the force F decreases.

FIG. 9B illustrates the relation between the angle of the apparatus body cover 110 and the load applied to the release lever 53 when the user opens the apparatus body cover 110. Similarly, as illustrated in FIG. 9B, as the tension spring 54 stretches sharply, the force F as the load applied to the release lever 53 increases sharply. Eventually, the force F decreases. According to the embodiment, when the load applied to the release lever 53 reaches a predetermined value F2, the release lever 53 tilts. Hence, with allowance, the restrictors 113 are disposed in the guide range R where the restrictors 113 interfere with the release lever 53. The guide range R is defined by the angle of the apparatus body cover 110. The load applied to the release lever 53 is not smaller than the predetermined value F1 that is smaller than the predetermined value F2. For example, each of the restrictors 113 has a length in a vertical direction thereof and a height in a direction perpendicular to the vertical direction that cause the restrictors 113 to interfere with the release lever 53 and prevent tilting of the release lever 53 when the load applied to the release lever 53 is not smaller than the predetermined value F1.

As illustrated in FIGS. 6A, 6B, and 7 and the like, the apparatus body cover 110 according to the embodiment mounts the slope member 112 serving as the slide portion.

As described above with reference to FIGS. 5A and 5B and the like, as the user closes the apparatus body cover 110, the release lever 53 is pressed against the slope member 112 while the release lever 53 slides over the slope member 112. The slope member 112 serving as the slide portion pivots the release lever 53 about the support shaft 53*a* counterclockwise in FIGS. 5A and 7 in the backward direction D53B.

As the user opens the apparatus body cover 110, also when the release lever 53 pivots about the support shaft 53*a* clockwise in FIGS. 5A and 7 in the forward direction D53A, the release lever 53 slides over the slope member 112 serving as the slide portion.

According to the embodiment, the slope member 112 serving as the slide portion mounted on the apparatus body cover 110 decreases sliding resistance between the release lever 53 and the slope member 112.

For example, as illustrated in FIG. 7, the slope member 112 includes a slope 112*a* over which the release lever 53 slides. The slope 112*a* is inclined with respect to the back face 110*x* of the apparatus body cover 110 at a predetermined inclination angle $\alpha$. The slope 112*a* is an inclined face having a distance from the back face 110*x* of the apparatus body cover 110, that increases toward the pivot shaft 110*a*. For example, the inclined face separates from the back face 110*x* farther toward the pivot shaft 110*a*.

Specifically, the slope member 112 defines a hypothetical line S0 that is perpendicular to the slope 112*a*. The release lever 53 contacts the slope 112*a* at a contact portion C enclosed with a broken line in FIG. 7. The contact portion C and the support shaft 53*a* define a hypothetical line S1 therebetween. The hypothetical lines S0 and S1 define an angle $\theta$. The back face 110*x* defines a hypothetical line S2 that is perpendicular to the back face 110*x*. The release lever 53 hypothetically contacts the back face 110*x* at a hypothetical contact portion C1. The hypothetical contact portion C1 and the support shaft 53*a* define a hypothetical line S3 therebetween. The hypothetical lines S2 and S3 define an angle $\theta$1. The angle $\theta$ is greater than the angle $\theta$1.

The apparatus body cover 110 mounts the slope member 112 having the slope 112*a*. Accordingly, compared to a configuration in which the apparatus body cover 110 does not mount the slope member 112 and the release lever 53 slides over the back face 110*x* of the apparatus body cover 110 directly, the slope member 112 decreases sliding resistance between the release lever 53 and the slope member 112. Consequently, as the user opens and closes the apparatus body cover 110 as described above, the release lever 53 interlocked with the apparatus body cover 110 pivots smoothly.

The slope 112*a* of the slope member 112 is made of a low friction material such as fluorine coating, further facilitating smooth pivoting of the release lever 53.

The apparatus body cover 110 according to the embodiment mounts the restrictors 113, the slope member 112 serving as the slide portion, and the engagement 111 that are separate parts, respectively. Alternatively, at least two of the restrictors 113, the slope member 112 serving as the slide portion, and the engagement 111 may be combined into a single part. For example, the restrictors 113 and the slope member 112 may be combined.

Accordingly, the image forming apparatus 1 decreases a number of parts.

A description is provided of a construction of an image forming apparatus 1A as a first modification example of the image forming apparatus 1.

Figure 10:
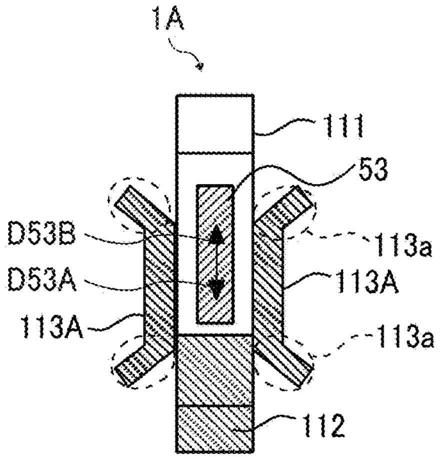
FIG. 10 is a diagram of an image forming apparatus as a first modification example of the image forming apparatus depicted in FIG. 8, illustrating the release lever and a restrictor, seen in the direction perpendicular to the back face of the apparatus body cover.

FIG. 10 illustrates the image forming apparatus 1A as the first modification example that includes restrictors 113A. Each of the restrictors 113A includes tapered portions 113*a* that are disposed at at least one of an upstream end or a downstream end of the restrictor 113A in a pivot direction (e.g., the forward direction D53A) of the release lever 53. The tapered portions 113*a* are inclined in a separation direction that separates from the release lever 53.

Specifically, the two restrictors 113A serving as walls sandwich the release lever 53. As illustrated in FIG. 10, when seen in a direction perpendicular to the back face 110*x* of the apparatus body cover 110, the tapered portions 113*a* are disposed at the upstream end and the downstream end of each of the restrictors 113A, respectively, in a moving direction of the release lever 53, that is, the pivot direction (e.g., the forward direction D53A). Each of the tapered portions 113*a* is inclined in the separation direction in which each of the tapered portions 113*a* separates from the release lever 53 from a center portion to an end portion of the restrictor 113A in the pivot direction of the release lever 53.

Accordingly, when the release lever 53 reaches the restrictor 113A while the release lever 53 pivots, even if the restrictor 113A is shifted in a width direction thereof, that is, a horizontal direction in FIG. 10, the tapered portions 113*a* guide the release lever 53 to a gap between the restrictors 113A smoothly.

A description is provided of a construction of an image forming apparatus 1B as a second modification example of the image forming apparatus 1.

Figure 11:
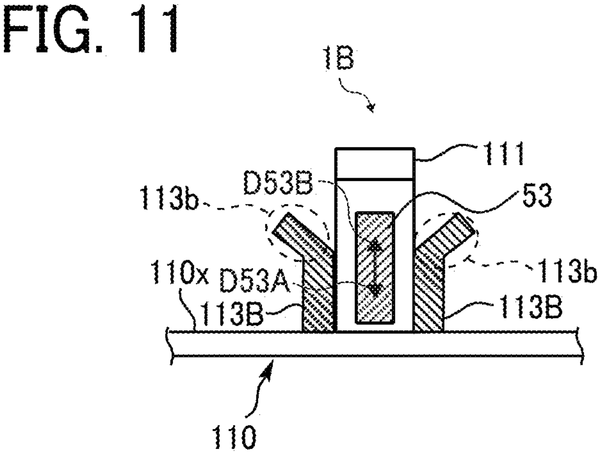
FIG. 11 is a diagram of an image forming apparatus as a second modification example of the image forming apparatus depicted in FIG. 8, illustrating the release lever and a restrictor, seen in a direction parallel to the back face of the apparatus body cover.

FIG. 11 illustrates the image forming apparatus 1B as the second modification example that includes restrictors 113B. Each of the restrictors 113B includes a tapered portion 113*b* that is disposed at one end (e.g., a distal end) of the restrictor 113B, that is separated from the apparatus body cover 110 farther than another end (e.g., a proximal end) of the restrictor 113B is. The another end is disposed in proximity to or abuts on the apparatus body cover 110. The tapered portion 113*b* is inclined in a separation direction that separates from the release lever 53.

Specifically, the two restrictors 113B serving as walls sandwich the release lever 53. As illustrated in FIG. 11, when seen in a direction that is perpendicular to the back face 110*x* of the apparatus body cover 110 and is parallel to an extension direction in which each of the restrictors 113B extends along the back face 110*x*, the tapered portion 113*b* is disposed at a tip of each of the restrictors 113B in a direction in which each of the restrictors 113B stands on the back face 110*x* of the apparatus body cover 110. Each of the tapered portions 113*b* is inclined in a separation direction in which each of the tapered portions 113*b* separates from the release lever 53 from a center portion to an end portion of the restrictor 113B in the pivot direction (e.g., the forward direction D53A) of the release lever 53.

Accordingly, when the release lever 53 reaches the restrictor 113B while the release lever 53 pivots, even if the restrictor 113B is shifted in a width direction thereof, that is, a horizontal direction in FIG. 11, the tapered portions 113*b* guide the release lever 53 to a gap between the restrictors 113B smoothly.

A description is provided of a construction of an image forming apparatus 1C as a third modification example of the image forming apparatus 1.

Figure 12:
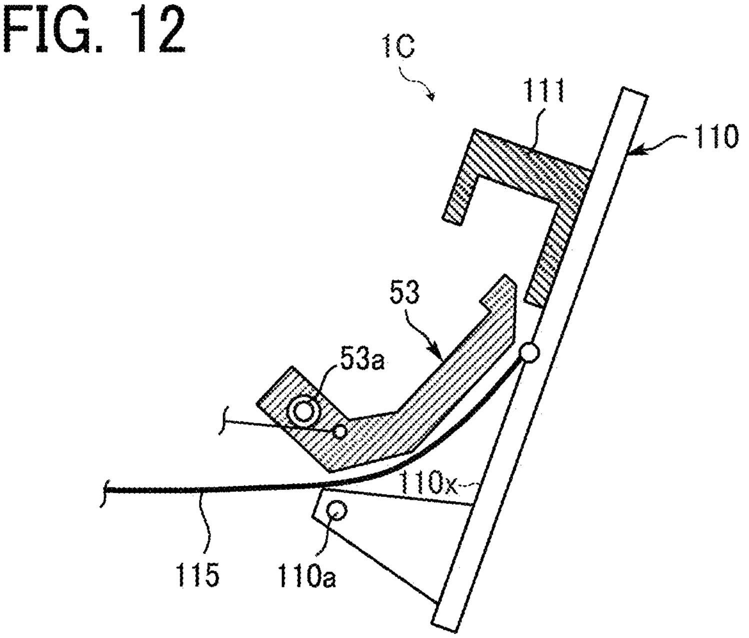
FIG. 12 is a diagram of an image forming apparatus as a third modification example of the image forming apparatus depicted in FIG. 8, illustrating the release lever and a belt when the apparatus body cover is opened.

FIG. 12 illustrates the image forming apparatus 1C as the third modification example that includes a belt 115 instead of the slope member 112 depicted in FIG. 7. The belt 115 serves as a flexible member that has ends. The belt 115 serves as a slide portion attached to the apparatus body cover 110. As the user closes the apparatus body cover 110, the release lever 53 interlocked with the apparatus body cover 110 slides over the belt 115 while the release lever 53 pivots.

The belt 115 is stretched between the apparatus body cover 110 and a frame of the apparatus body 10 of the image forming apparatus 1C, that supports the pivot shaft 110*a* of the apparatus body cover 110. The belt 115 restricts an open range of the apparatus body cover 110.

Specifically, the belt 115 includes one end that is coupled with the apparatus body cover 110 and another end that is coupled with the frame of the apparatus body 10 of the image forming apparatus 1C. While the apparatus body cover 110 is closed, the belt 115 is bent or slacked inside the apparatus body 10 of the image forming apparatus 1C. As the user opens the apparatus body cover 110, the belt 115 is stretched between the apparatus body cover 110 and the frame of the apparatus body 10 of the image forming apparatus 1C. In a state in which the belt 115 is stretched fully, the belt 115 defines an opening angle of the apparatus body cover 110.

When the release lever 53 pivots as the user opens and closes the apparatus body cover 110, the belt 115 configured as described above prevents the release lever 53 from sliding over the back face 110*x* of the apparatus body cover 110 directly and causes the release lever 53 to slide over the belt 115. The belt 115 is deformed flexibly in accordance with a posture of the release lever 53. Hence, the belt 115 decreases sliding resistance between the release lever 53 and the belt 115 and impact that generates when the release lever 53 contacts the belt 115. Accordingly, the belt 115 facilitates smooth pivoting of the release lever 53 interlocked with the apparatus body cover 110 as the user opens and closes the apparatus body cover 110.

A description is provided of a construction of a fixing device 20A as a fourth modification example of the fixing device 20.

Figure 13:
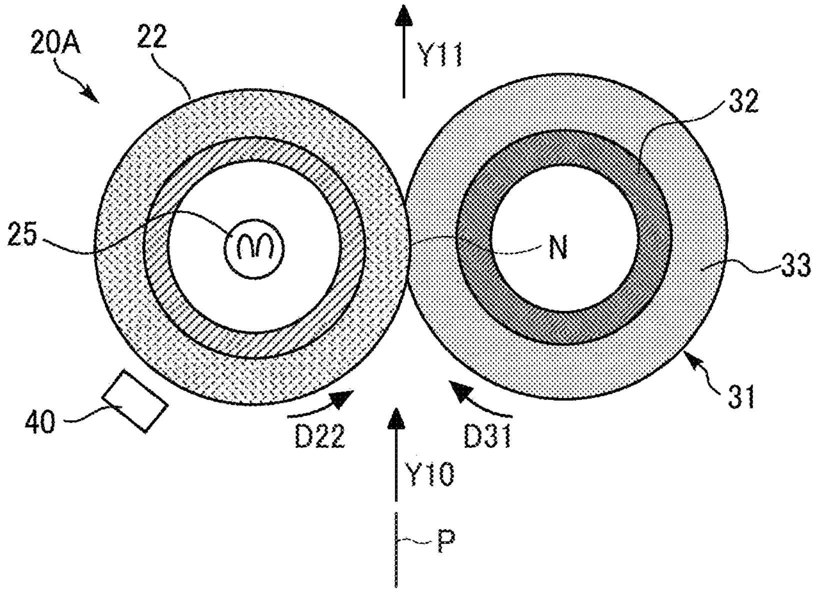
FIG. 13 is a cross-sectional view of a fixing device as a fourth modification example of the fixing device depicted in FIG. 2.

FIG. 13 illustrates the fixing device 20A as the fourth modification example that serves as a pressure device and employs a heater-roller system. The fixing device 20A includes a fixing roller 22 serving as a fixing rotator and a halogen heater 25 serving as a heater.

Specifically, the fixing roller 22 serving as the fixing rotator and a pressure body includes a core metal that is hollow and made of a metal material such as stainless steel. The fixing roller 22 further includes coating layers disposed on the core metal. The coating layers include an elastic layer that coats the core metal and a release layer that coats the elastic layer. Thus, the fixing roller 22 includes a plurality of layers. The fixing roller 22 presses against the pressure roller 31 serving as the pressure rotator and the pressed body to form the fixing nip N therebetween.

The elastic layer serving as the coating layer of the fixing roller 22 is made of an elastic material such as fluororubber, silicone rubber, and silicone rubber foam. The release layer serving as the coating layer of the fixing roller 22 is made of PFA or the like.

The halogen heater 25 serving as the heater is stationarily disposed inside the fixing roller 22. For example, the halogen heater 25 is disposed in a hollow portion of the fixing roller 22.

A description is provided of operation of the fixing device 20A having the construction described above.

As the power switch (e.g., a main switch) disposed inside the apparatus body 10 is turned on, the power supply disposed inside the apparatus body 10 supplies power to the halogen heater 25. For example, the power supply applies an alternating current voltage to the halogen heater 25 through a harness.

As the image forming apparatus 1 receives an instruction for printing (e.g., a print request), the driving motor (e.g., a driving mechanism) starts driving and rotating the pressure roller 31 clockwise in FIG. 13 in the rotation direction D31. Thus, the pressure roller 31 starts driving and rotating the fixing roller 22 counterclockwise in FIG. 13 in a rotation direction D22. Thereafter, a sheet P is conveyed from the sheet feeder 12 depicted in FIG. 1 to the secondary transfer nip where the secondary transfer roller 89 secondarily transfers a toner image formed on the intermediate transfer belt 78 onto the sheet P. Thus, the sheet P bears the unfixed toner image. The sheet P bearing the unfixed toner image is conveyed in the sheet conveyance direction Y10 depicted in FIG. 13 and enters the fixing nip N formed between the pressure roller 31 and the fixing roller 22 pressed against the pressure roller 31. The fixing roller 22 and the pressure roller 31 fix the toner image on the surface of the sheet P under heat from the fixing roller 22 and pressure applied by the fixing roller 22 and the pressure roller 31. The fixing roller 22 and the pressure roller 31, that rotate, discharge the sheet P bearing the fixed toner image from the fixing nip N in the sheet conveyance direction Y11.

The image forming apparatus 1 incorporating the fixing device 20A having the construction described above also includes the presser 51 depicted in FIGS. 5A and 5B. The apparatus body cover 110 mounts the restrictors 113, the engagement 111, the slope member 112 serving as the slide portion, and the like. Accordingly, the release lever 53 of the fixing device 20A causes the presser 51 to apply and release pressure properly.

A description is provided of a construction of a fixing device 20B as a fifth modification example of the fixing device 20.

Figure 14:
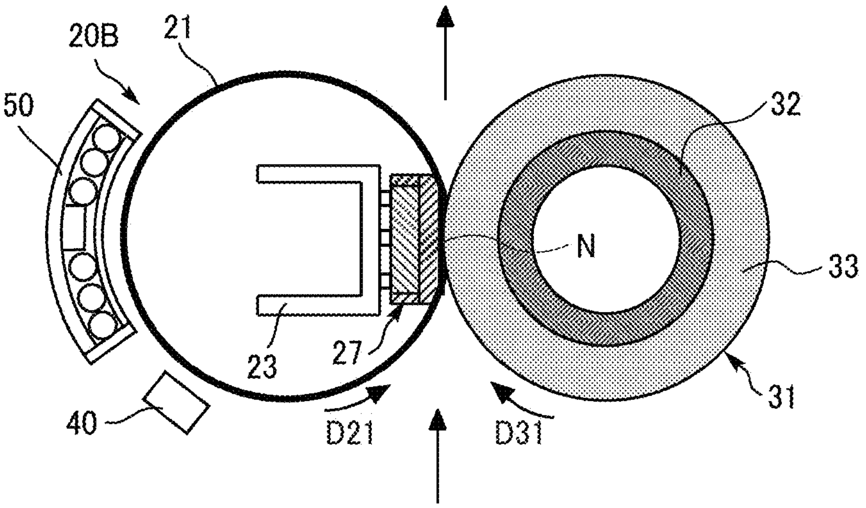
FIG. 14 is a cross-sectional view of a fixing device as a fifth modification example of the fixing device depicted in FIG. 2.

FIG. 14 illustrates the fixing device 20B as the fifth modification example that employs an electromagnetic induction heating system. The fixing device 20B does not employ a heater heating system using the laminated heater 24 or the halogen heater 25. The fixing device 20B employs the electromagnetic induction heating system using an electromagnetic induction coil 50 that is disposed opposite the outer circumferential face of the fixing belt 21.

Specifically, like the fixing device 20 depicted in FIG. 2, the fixing device 20B as the fifth modification example also includes a nip formation pad 27. However, the nip formation pad 27 is different from the laminated heater 24 serving as the nip formation pad.

The fixing device 20B as the fifth modification example includes the electromagnetic induction coil 50 (e.g., an induction heater) serving as a heater. The electromagnetic induction coil 50 heats the fixing belt 21 of the fixing device 20B as the fifth modification example by electromagnetic induction.

The electromagnetic induction coil 50 is combined with a core, a coil guide, and the like into a unit. The electromagnetic induction coil 50 includes litz wire constructed of thin wire strands. The litz wire extends in the longitudinal direction of the fixing belt 21 such that the litz wire covers a part of the fixing belt 21. The coil guide is made of a resin material or the like that has an enhanced heat resistance. The coil guide holds the electromagnetic induction coil 50 and the core. The core is made of ferromagnet, such as ferrite, that has a relative permeability in a range of from approximately 1,000 to approximately 3,000. The core is semi-tubular. The core includes a center core portion and side core portions that generate a magnetic flux directed to the fixing belt 21 effectively. The core is disposed opposite the electromagnetic induction coil 50 that extends in the longitudinal direction of the fixing belt 21.

In addition to the base layer, the elastic layer, and the release layer described above with reference to FIG. 2 and the like, the fixing belt 21 further includes a heat generating layer that is heated by the electromagnetic induction coil 50 by electromagnetic induction. For example, the heat generating layer is sandwiched between the elastic layer and the release layer. Alternatively, the base layer may be used as the heat generating layer. The heat generating layer is made of metal such as nickel, stainless steel, iron, copper, cobalt, chromium, aluminum, gold, platinum, silver, tin, and palladium, an alloy made of a plurality of the metals, or the like.

A description is provided of operation of the fixing device 20B having the construction described above.

As the fixing belt 21 rotates in the rotation direction D21 depicted in FIG. 14, the electromagnetic induction coil 50 heats the fixing belt 21 at a heating position where the fixing belt 21 is disposed opposite the electromagnetic induction coil 50. For example, as a high-frequency alternating current is supplied to the electromagnetic induction coil 50, lines of magnetic force generate around the fixing belt 21 such that the lines of magnetic force switch back bidirectionally. As an eddy current generates on a surface of the heat generating layer of the fixing belt 21, the heat generating layer generates Joule heat by electric resistance of the heat generating layer. The Joule heat heats the heat generating layer by electromagnetic induction, heating the fixing belt 21.

FIG. 14 illustrates the electromagnetic induction coil 50 that is disposed opposite the outer circumferential face of the fixing belt 21. Alternatively, the electromagnetic induction coil 50 may be disposed opposite the inner circumferential face of the fixing belt 21.

The fixing device 20B employing the electromagnetic induction heating system as described above may be installed in the image forming apparatus 1. As illustrated in FIGS. 5A and 5B, the image forming apparatus 1 includes the presser 51. The image forming apparatus 1 further includes the restrictors 113, the engagement 111, and the slope member 112 serving as the slide portion that are mounted on the apparatus body cover 110. Accordingly, the release lever 53 of the fixing device 20B causes the presser 51 to apply and release pressure properly.

As described above, an image forming apparatus (e.g., the image forming apparatuses 1, 1A, 1B, and 1C) according to the embodiments of the present disclosure includes a fixing device (e.g., the fixing devices 20, 20A, and 20B) serving as the pressure device. The fixing device includes the presser 51 and the release lever 53. The presser 51 presses a pressure body (e.g., the fixing belt 21 and the fixing roller 22) against the pressure roller 31 serving as the pressed body. As the release lever 53 pivots about the support shaft 53*a* in a predetermined pivot direction (e.g., the forward direction D53A), the release lever 53 releases pressure applied to the pressure body by the presser 51. The fixing device is disposed inside the apparatus body 10 of the image forming apparatus. The image forming apparatus further includes the apparatus body cover 110. As the apparatus body cover 110 pivots about the pivot shaft 110*a* in a predetermined pivot direction (e.g., the pivot direction D110), the apparatus body cover 110 opens and exposes the interior of the apparatus body 10 of the image forming apparatus. As the apparatus body cover 110 is opened and closed, the release lever 53 interlocked with the apparatus body cover 110 pivots about the support shaft 53*a* in the forward direction D53A and the backward direction D53B, causing the presser 51 to release and apply pressure. The apparatus body cover 110 mounts restrictors (e.g., the restrictors 113, 113A, and 113B) that restrict tilting of the release lever 53 in the axial direction A53 thereof while the release lever 53 pivots.

Accordingly, the release lever 53 of the fixing device causes the presser 51 to apply and release pressure properly.

A description is provided of modified configurations of the image forming apparatus according to the embodiments of the present disclosure.

The embodiments of the present disclosure are applied to the image forming apparatus incorporating the fixing device serving as the pressure device that includes the pressure body and the pressed body. The pressure body is the fixing belt 21 or the fixing roller 22 serving as the fixing rotator. The pressed body is the pressure roller 31 serving as the pressure rotator. Alternatively, the embodiments of the present disclosure may be applied to an image forming apparatus incorporating a fixing device serving as a pressure device that includes a pressed body and a pressure body. The pressed body is the fixing belt 21 or the fixing roller 22 serving as the fixing rotator. The pressure body is the pressure roller 31 serving as the pressure rotator.

The embodiments of the present disclosure are applied to the image forming apparatus including the apparatus body 10 into which the fixing device serving as the pressure device is removably installed. Alternatively, the embodiments of the present disclosure may be applied to an image forming apparatus including an apparatus body into which a pressure device is not removably installed and therefore is stationarily installed.

The embodiments of the present disclosure are applied to the fixing device serving as the pressure device. Alternatively, the embodiments of the present disclosure may be applied to a pressure device that is different from the fixing device.

As illustrated in FIG. 3, in the fixing device 20 according to the embodiment of the present disclosure, as the pressure lever 52 of the presser 51 presses the flange 42, the pressure lever 52 presses against the fixing belt 21 serving as the fixing rotator indirectly through the flange 42. Alternatively, a pressure lever of a presser may press against a fixing rotator serving as a pressure body directly.

According to the embodiments, as illustrated in FIGS. 8, 10, and 11, the restrictors (e.g., the restrictors 113, 113A, and 113B) sandwich the release lever 53. Alternatively, in a case that the release lever 53 tilts in one direction, a single restrictor may be disposed opposite the release lever 53 to contact the release lever 53 tilted toward the restrictor.

Accordingly, the modified configurations of the image forming apparatus also achieve advantages similar to the advantages of the image forming apparatus according to the embodiments of the present disclosure.

The technology of the present disclosure is not limited to the embodiments described above. The embodiments of the present disclosure are modified properly to configurations or constructions other than those suggested in the embodiments described above within the scope of the technology of the present disclosure. The number, the position, the shape, and the like of the elements and the components according to the embodiments of the present disclosure are not limited to those suggested in the embodiments described above and are modified to the number, the position, the shape, and the like that are appropriate to achieve the technology of the present disclosure.

A description is provided of a first aspect to an eleventh aspect of the embodiments of the present disclosure. For example, two or more of the first aspect to the eleventh aspect may be combined.

A description is provided of the first aspect of the embodiments of the present disclosure.

As illustrated in FIG. 1, an image forming apparatus (e.g., the image forming apparatuses 1, 1A, 1B, and 1C) includes an apparatus body (e.g., the apparatus body 10) and a pressure device (e.g., the fixing devices 20, 20A, and 20B). The pressure device is disposed inside the apparatus body.

As illustrated in FIGS. 5A and 5B, the pressure device includes a pressed body (e.g., the pressure roller 31), a pressure body (e.g., the fixing belt 21 and the fixing roller 22), a presser (e.g., the presser 51), a release lever (e.g., the release lever 53), and a support shaft (e.g., the support shaft 53*a*). The presser presses the pressure body against the pressed body.

As illustrated in FIG. 1, the image forming apparatus further includes an apparatus body cover (e.g., the apparatus body cover 110) and a pivot shaft (e.g., the pivot shaft 110*a*). As the apparatus body cover pivots about the pivot shaft in a predetermined pivot direction (e.g., the pivot direction D110), the apparatus body cover opens and exposes an interior of the apparatus body.

As illustrated in FIGS. 5A and 5B, as the apparatus body cover opens, the release lever pivots about the support shaft in a forward direction (e.g., the forward direction D53A) and causes the presser to release pressure applied to the pressure body. As the apparatus body cover closes, the release lever pivots about the support shaft in a backward direction (e.g., the backward direction D53B) and causes the presser to apply pressure to the pressure body.

The image forming apparatus further includes a restrictor (e.g., the restrictors 113, 113A, and 113B) that is mounted on the apparatus body cover. The restrictor restricts tilting of the release lever in an axial direction thereof (e.g., the axial direction A53) while the release lever pivots.

A description is provided of the second aspect of the embodiments of the present disclosure.

According to the first aspect, as illustrated in FIGS. 9A and 9B, the restrictor is disposed in an angular range (e.g., the guide range R), that is defined by the angle of the apparatus body cover, where a force (e.g., the force F) applied to the release lever in a tilt direction thereof when the release lever pivots is not smaller than a predetermined value (e.g., the predetermined value F1).

A description is provided of the third aspect of the embodiments of the present disclosure.

According to the first aspect or the second aspect, as illustrated in FIGS. 5A and 5B, the image forming apparatus further includes a slide portion (e.g., the slope member 112 and the belt 115) that is mounted on the apparatus body cover. As the apparatus body cover closes, the slide portion presses the release lever while the release lever slides over the slide portion. Thus, the slide portion causes the release lever to pivot in the backward direction. The slide portion decreases sliding resistance between the release lever and the slide portion.

A description is provided of the fourth aspect of the embodiments of the present disclosure.

According to the third aspect, as illustrated in FIG. 7, the slide portion includes a slope (e.g., the slope 112*a*) over which the release lever slides.

A description is provided of the fifth aspect of the embodiments of the present disclosure.

According to the third aspect or the fourth aspect, as illustrated in FIG. 7, the slide portion is combined with the restrictor.

A description is provided of the sixth aspect of the embodiments of the present disclosure.

According to the third aspect, as illustrated in FIG. 12, the slide portion includes a belt (e.g., the belt 115) having ends. The belt is stretched between the apparatus body cover and the apparatus body. The belt restricts an open range in which the apparatus body cover opens. The open range is defined by an angle of the apparatus body cover.

A description is provided of the seventh aspect of the embodiments of the present disclosure.

According to any one of the first aspect to the sixth aspect, as illustrated in FIG. 5A, the restrictor is a wall that stands on a back face (e.g., the back face 110*x*) of the apparatus body cover in a direction perpendicular to the back face.

As illustrated in FIGS. 10 and 11, the restrictor includes a tapered portion (e.g., the tapered portions 113*a* and 113*b*) that is disposed at at least one of an upstream end or a downstream end of the restrictor in the forward direction of the release lever. The tapered portion is inclined in a separation direction that separates from the release lever.

A description is provided of the eighth aspect of the embodiments of the present disclosure.

According to any one of the first aspect to the seventh aspect, as illustrated in FIG. 11, the restrictor is the wall that stands on the back face of the apparatus body cover in the direction perpendicular to the back face.

The restrictor includes the tapered portion (e.g., the tapered portion 113*b*) that is disposed at one end of the restrictor, that is separated from the apparatus body cover farther than another end of the restrictor is. The another end is disposed in proximity to the apparatus body cover. The tapered portion is inclined in the separation direction that separates from the release lever.

A description is provided of the ninth aspect of the embodiments of the present disclosure.

According to any one of the first aspect to the eighth aspect, as illustrated in FIGS. 5A and 5B, the image forming apparatus further includes an engagement (e.g., the engagement 111) that is mounted on the apparatus body cover. As the apparatus body cover opens, the engagement engages the release lever and pivots the release lever in the forward direction.

A description is provided of the tenth aspect of the embodiments of the present disclosure.

According to any one of the first aspect to the ninth aspect, as illustrated in FIGS. 5A and 5B, the presser includes a pressure lever (e.g., the pressure lever 52) and a shaft portion (e.g., the shaft 52*a*). The pressure lever pivots about the shaft portion in a forward direction (e.g., the forward direction D52A) and a backward direction (e.g., the backward direction D52B). The pressure lever pivots about the shaft portion in the forward direction to press the pressure body against the pressed body in a pressing direction (e.g., the pressing direction D52C).

The pressure device further includes a tension spring (e.g., the tension spring 54) that is coupled with the pressure lever and the release lever.

A description is provided of the eleventh aspect of the embodiments of the present disclosure.

According to any one of the first aspect to the tenth aspect, as illustrated in FIGS. 2, 13, and 14, the pressure device includes a fixing device (e.g., the fixing devices 20, 20A, and 20B) including a fixing rotator (e.g., the fixing belt 21 and the fixing roller 22) serving as one of the pressed body and the pressure body and a pressure rotator (e.g., the pressure roller 31) serving as another one of the pressed body and the pressure body. The pressure rotator presses against the fixing rotator to form a fixing nip (e.g., the fixing nip N) therebetween, through which a sheet (e.g., the sheet P) is conveyed.

Accordingly, the image forming apparatus incorporates the pressure device that includes the release lever that causes the presser to apply and release pressure properly.

According to the embodiments described above, the fixing belt 21 serves as a fixing rotator. Alternatively, a fixing film, a fixing sleeve, or the like may be used as a fixing rotator. Further, the pressure roller 31 serves as a pressure rotator. Alternatively, a pressure belt or the like may be used as a pressure rotator.

According to the embodiments described above, the image forming apparatus 1 is a printer. Alternatively, the image forming apparatus 1 may be a copier, a facsimile machine, a multifunction peripheral (MFP) having at least two of copying, printing, scanning, facsimile, and plotter functions, or the like.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An image forming apparatus comprising:
an apparatus body;
a pressure device disposed inside the apparatus body, the pressure device including:
a pressure body;
a pressed body disposed opposite the pressure body;
a presser to press the pressure body against the pressed body; and
a release lever to pivot in a forward direction to cause the presser to release pressure applied to the pressure body;
an apparatus body cover to pivot to cause the presser to release the pressure applied to the pressure body; and
a restrictor mounted on the apparatus body cover, the restrictor to restrict tilting of the release lever in an axial direction of the release lever while the release lever pivots between an interlocked position and an open position, wherein
the restrictor has a length in a vertical direction and a height in a direction perpendicular to both the vertical direction and the axial direction,
the restrictor includes a pair of restrictors that sandwich the release lever, and
the pair of restrictors to restrict tilting of the release lever in all of the interlocked position, the open position, and between the interlocked position and the open position.

2. The image forming apparatus according to claim 1, further comprising:
a support shaft about which the release lever pivots; and
a pivot shaft about which the apparatus body cover pivots in a pivot direction to open and expose an interior of the apparatus body,
wherein the apparatus body cover opens to pivot the release lever about the support shaft in the forward direction and to cause the presser to release the pressure applied to the pressure body, and
wherein the apparatus body cover closes to pivot the release lever about the support shaft in a backward direction and to cause the presser to apply the pressure to the pressure body.

3. The image forming apparatus according to claim 2, further comprising a slide portion mounted on the apparatus body cover, the slide portion over which the release lever slides to decrease sliding resistance between the release lever and the slide portion,
wherein the apparatus body cover closes to cause the slide portion to press the release lever while the release lever slides over the slide portion and to cause the slide portion to pivot the release lever in the backward direction.

4. The image forming apparatus according to claim 3, wherein the slide portion includes a slope over which the release lever slides.

5. The image forming apparatus according to claim 4, wherein the slope defines an inclined face having a distance from a back face of the apparatus body cover, the distance that increases toward the pivot shaft.

6. The image forming apparatus according to claim 3, wherein the slide portion is combined with the restrictor.

7. The image forming apparatus according to claim 3, wherein the slide portion includes a belt having ends, the belt stretched between the apparatus body cover and the apparatus body, the belt to restrict an open range in which the apparatus body cover opens, the open range defined by an angle of the apparatus body cover.

8. The image forming apparatus according to claim 1, wherein the restrictor includes a wall standing on a back face of the apparatus body cover in a direction perpendicular to the back face.

9. The image forming apparatus according to claim 8, wherein the restrictor further includes a tapered portion disposed at one end of the restrictor, the one end being separated from the apparatus body cover farther than another end of the restrictor is, said another end disposed in proximity to the apparatus body cover, and
wherein the tapered portion is inclined in a separation direction that separates from the release lever.

10. The image forming apparatus according to claim 1, further comprising an engagement mounted on the apparatus body cover, the engagement to engage the release lever and to pivot the release lever in the forward direction as the apparatus body cover opens.

11. The image forming apparatus according to claim 1, wherein the presser includes:
a pressure lever; and
a shaft portion about which the pressure lever pivots forward and backward, and
wherein the pressure lever pivots forward to press the pressure body against the pressed body in a pressing direction.

12. The image forming apparatus according to claim 11, wherein the pressure device further includes a tension spring coupled with the pressure lever and the release lever.

13. The image forming apparatus according to claim 1, wherein one of the pressure body and the pressed body includes a fixing rotator,
wherein another one of the pressure body and the pressed body includes a pressure rotator, and
wherein the fixing rotator and the pressure rotator form a fixing nip between the fixing rotator and the pressure rotator, the fixing nip through which a sheet is conveyed.

14. The image forming apparatus according to claim 13, wherein the fixing rotator includes one of a fixing belt and a fixing roller, and
wherein the pressure rotator includes a pressure roller.

15. The image forming apparatus according to claim 1, wherein:
the pair of restrictors further include tapered portions disposed at at least one of upstream ends or downstream ends of the pair of restrictors in the forward direction of the release lever, the tapered portions inclined in a separation direction that separates from the release lever.

16. An image forming apparatus comprising:

an apparatus body;

a pressure device disposed inside the apparatus body, the pressure device including:

a pressure body;

a pressed body disposed opposite the pressure body;

a presser to press the pressure body against the pressed body;

a support shaft; and a release lever to pivot about the support shaft in a forward direction to cause the presser to release pressure applied to the pressure body;

an apparatus body cover including a pivot shaft about which the apparatus body cover pivots in a pivot direction to open and expose an interior of the apparatus body, wherein the apparatus body cover opens to pivot the release lever about the support shaft in the forward direction and to cause the presser to release the pressure applied to the pressure body, and the apparatus body cover closes to pivot the release lever about the support shaft in a backward direction and to cause the presser to apply the pressure to the pressure body; and a restrictor mounted on the apparatus body cover, the restrictor to restrict tilting of the release lever in an axial direction of the release lever while the release lever pivots between an interlocked position and an open position, wherein the restrictor has a length in a vertical direction and a height in a direction perpendicular to both the vertical direction and the axial direction, the restrictor is disposed in a guide range defined by an angle of the apparatus body cover, the guide range being an angular range where a force applied to the release lever in a tilt direction of the release lever when the release lever pivots is not smaller than a predetermined value, the restrictor includes a pair of restrictors that sandwich the release lever, and the pair of restrictors to restrict tilting of the release lever in all of the interlocked position, the open position, and between the interlocked position and the open position.

17. The image forming apparatus according to claim 16, wherein the restrictor has the length in the vertical direction and the height in the direction perpendicular to the vertical direction and the axial direction, the length and the height with which the restrictor interferes with the release lever.

18. The image forming apparatus according to claim 16, wherein:

the predetermined value is a load value smaller than a second predetermined value at which the release lever tilts, and the guide range is defined as the angular range where a load applied to the release lever increases sharply as a tension spring coupled to the release lever stretches.

19. An image forming apparatus comprising:

an apparatus body;

a pressure device disposed inside the apparatus body, the pressure device including:

a pressure body;

a pressed body disposed opposite the pressure body;

a presser to press the pressure body against the pressed body; and a release lever to pivot in a forward direction to cause the presser to release pressure applied to the pressure body;

an apparatus body cover to pivot to cause the presser to release the pressure applied to the pressure body; and a restrictor mounted on the apparatus body cover, the restrictor to restrict tilting of the release lever in an axial direction of the release lever while the release lever pivots, wherein the restrictor includes a wall standing on a back face of the apparatus body cover in a direction perpendicular to the back face, and the restrictor further includes a tapered portion disposed at at least one of an upstream end or a downstream end of the restrictor in the forward direction of the release lever, the tapered portion inclined in a separation direction that separates from the release lever.

* * * * *